(12) United States Patent　(10) Patent No.: US 9,268,507 B2
Morita　(45) Date of Patent: Feb. 23, 2016

(54) IMAGE FORMING APPARATUS AND METHOD OF CONTROLLING THE SAME

(71) Applicant: CANON KABUSHIKI KAISHA, Tokyo (JP)

(72) Inventor: Seijiro Morita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/548,903

(22) Filed: Nov. 20, 2014

(65) Prior Publication Data

US 2015/0160898 A1　Jun. 11, 2015

(30) Foreign Application Priority Data

Dec. 11, 2013　(JP) ................. 2013-256441

(51) Int. Cl.
　*G06F 15/00*　(2006.01)
　*G06F 3/12*　(2006.01)
　*G06K 15/12*　(2006.01)

(52) U.S. Cl.
　CPC ............ *G06F 3/1208* (2013.01); *G06F 3/1221* (2013.01); *G06F 3/1255* (2013.01); *G06F 3/1263* (2013.01); *G06K 15/12* (2013.01); *G06F 2206/1506* (2013.01)

(58) Field of Classification Search
　CPC ............................. G06F 2206/1506
　USPC .......................................... 358/1.15
　See application file for complete search history.

(56) References Cited

U.S. PATENT DOCUMENTS

2010/0085395 A1* 4/2010 Shimoda ............. B41J 2/04528
　　　　　　　　　　　　　　　　　　　　　347/6
2013/0084092 A1　4/2013 Ooyanagi

FOREIGN PATENT DOCUMENTS

JP　　2013-76890 A　4/2013

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A image forming apparatus acquires an amount of a printing material for image data of each page included in the print job formed from a plurality of pages; and transmits, to an image forming unit, image data of an Mth page included in the print job after transmitting, to a temperature control unit, information of the acquired amount of the printing material for the image data of the Mth page included in the print job. Particularly, when another job to be executed with a higher priority, the transmission unit transmits image data of a page included in the other job to the image forming unit after transmitting, to the image forming unit, the image data of the page corresponding to the information of the amount of the printing material transmitted to the temperature control unit.

11 Claims, 15 Drawing Sheets

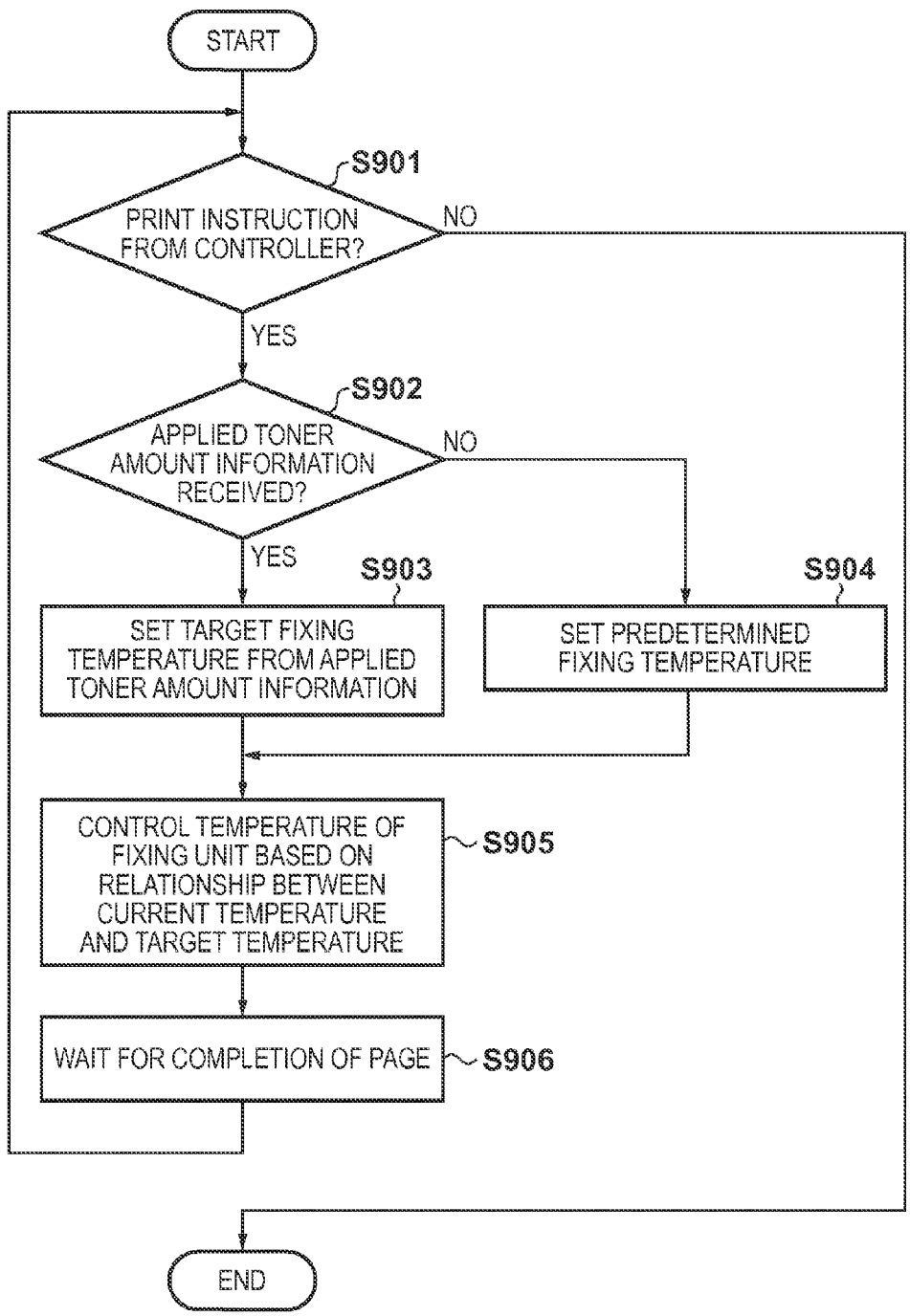

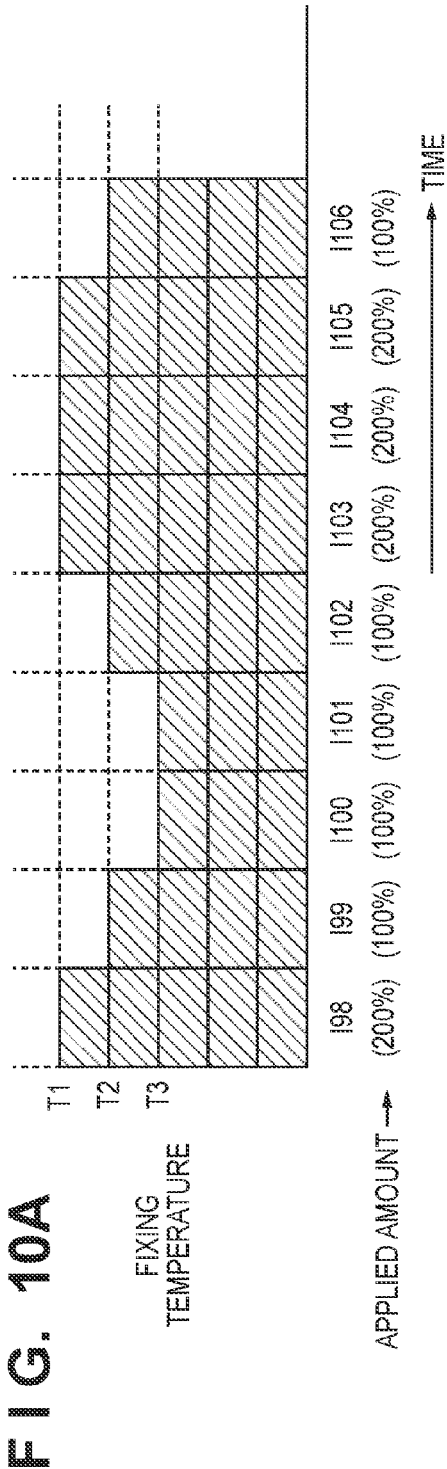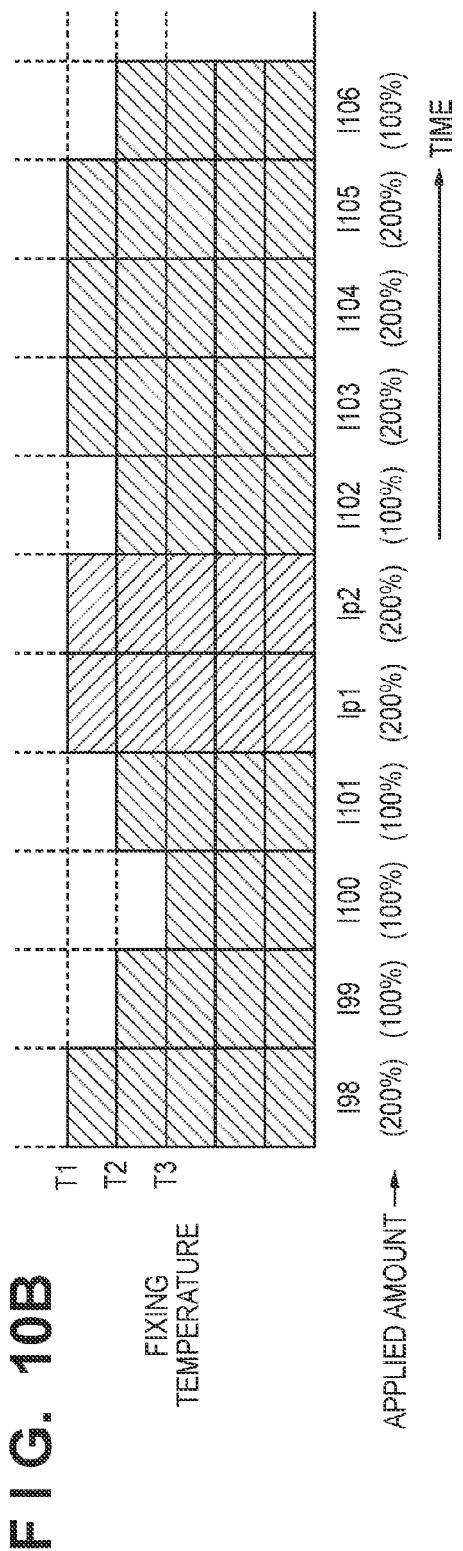

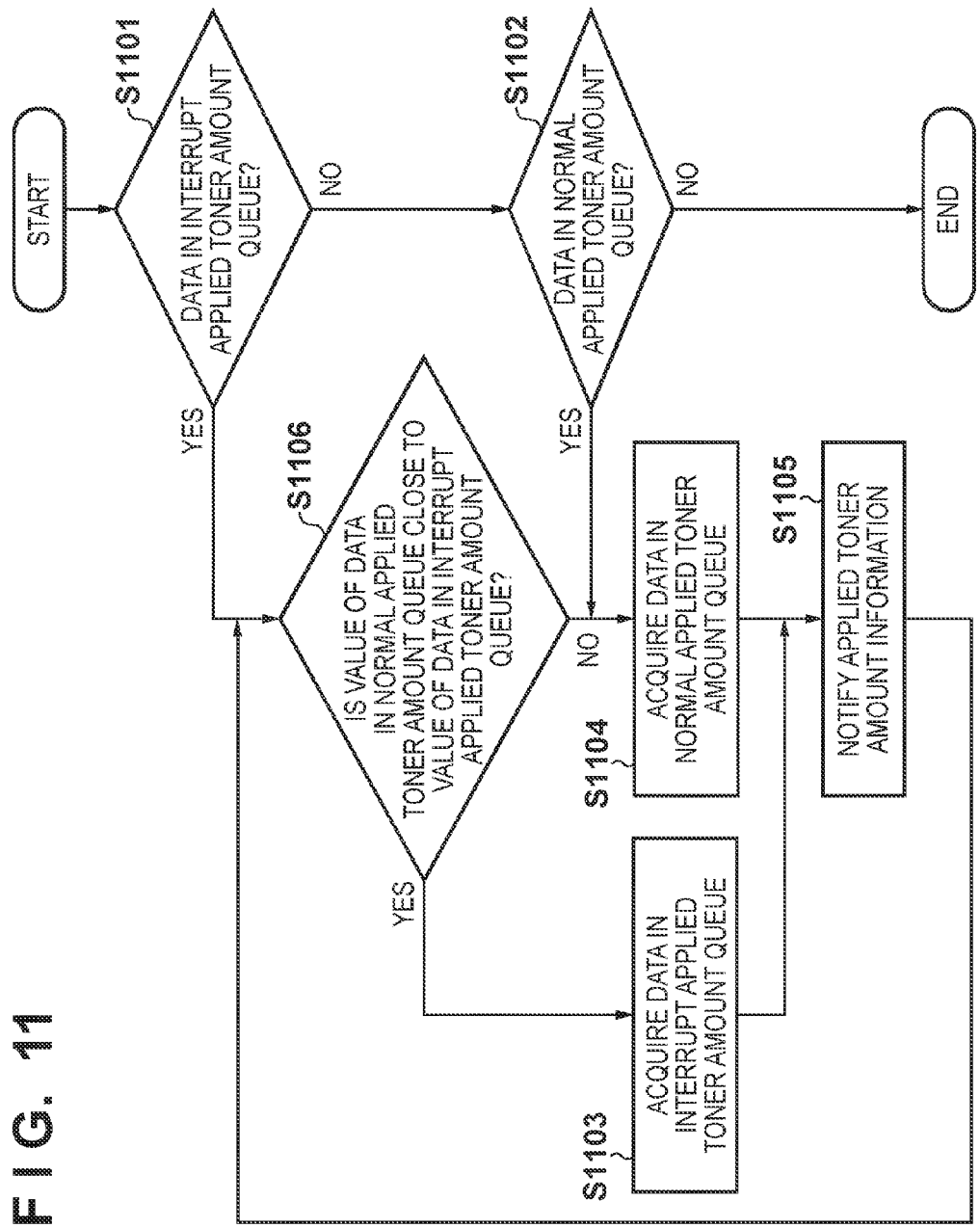

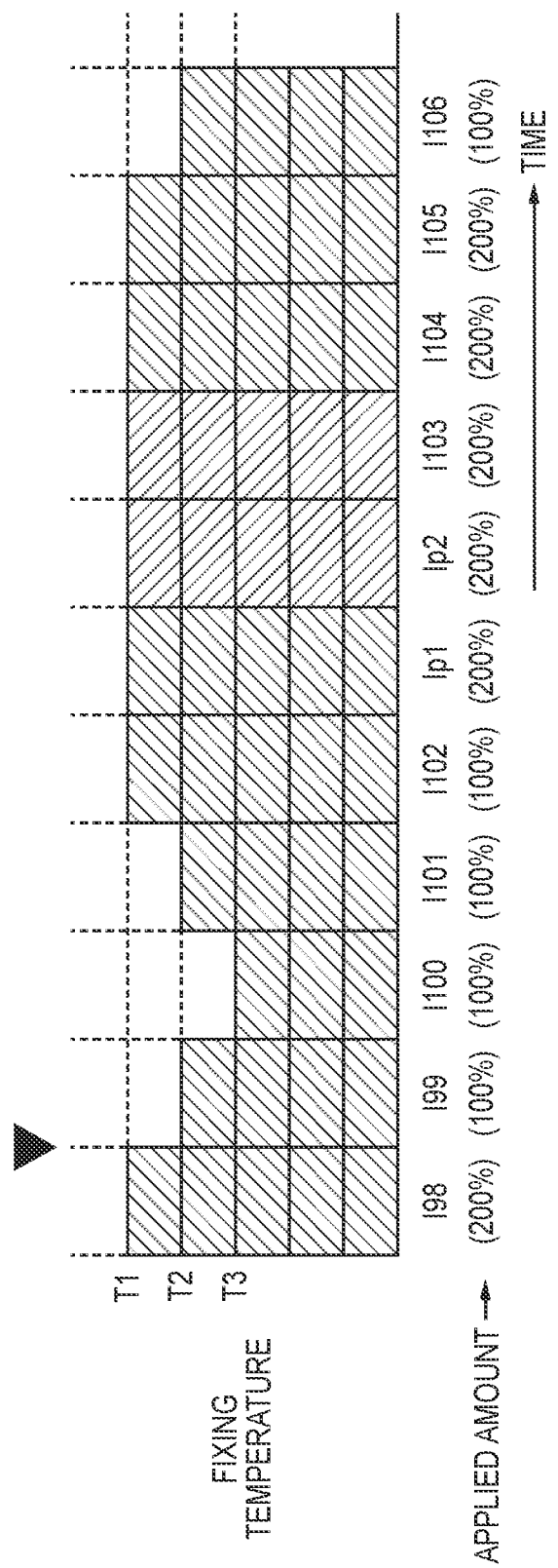

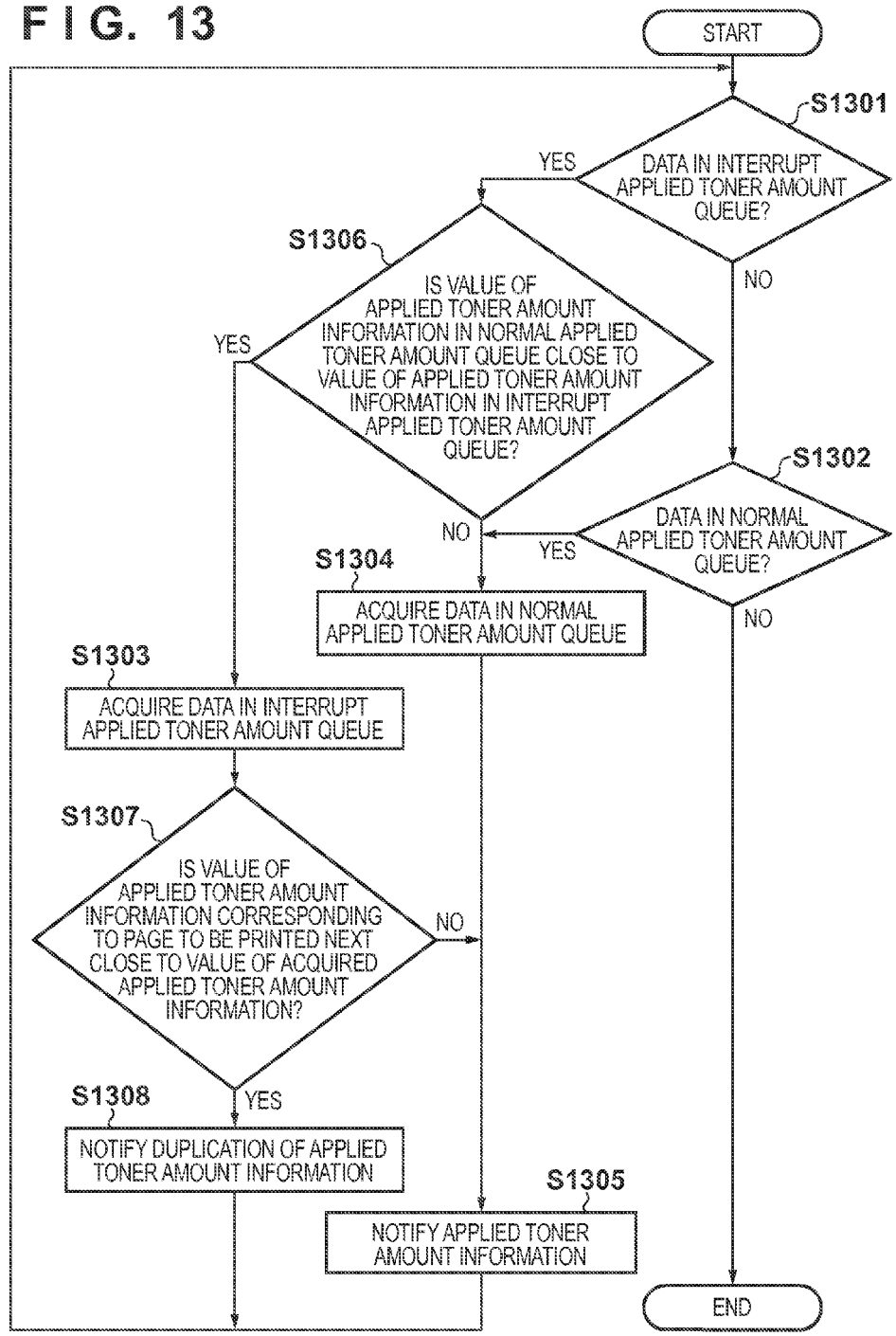

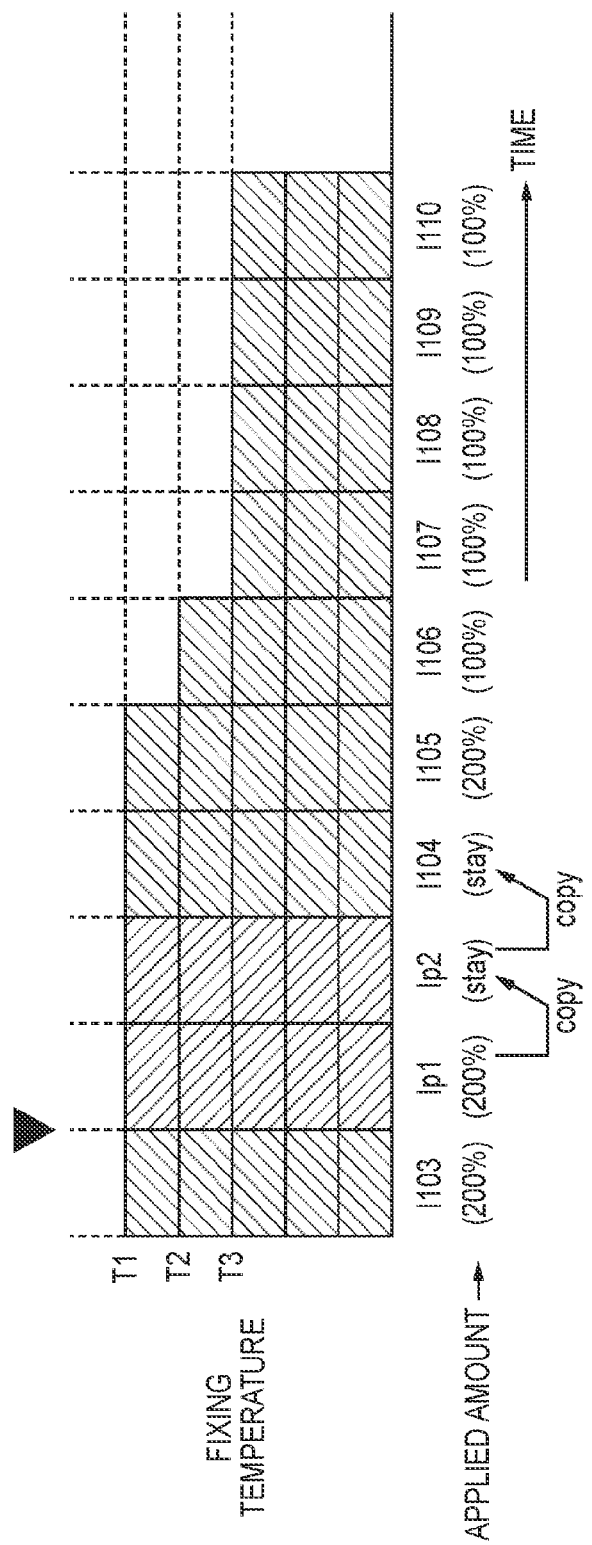

IMAGE FORMING APPARATUS AND METHOD OF CONTROLLING THE SAME

BACKGROUND OF THE INVENTION

1. Field of the Invention

The present invention relates to fixing control of an image formed by an electrophotographic method.

2. Description of the Related Art

Because of recent rising awareness of ecological problems, power consumption is required to be reduced, and there is a need of more energy-saving fixing temperature control capable of adjustment to a temperature that can reliably fix an image for each page when the amount of applied toner changes depending on the image of a page to be output. For example, Japanese Patent Laid-Open No. 2013-76890 discloses a technique of creating a temperature-regulate profile in advance from the print setting of a print job of a plurality of pages and printing at an appropriate fixing temperature based on the profile at the time of printing.

In a general image forming apparatus, an interrupt function capable of printing by interrupting printing under execution is implemented. This allows the user to execute urgent copying or printing with priority over the job currently printing.

However, when the interrupt printing function is used, it may be impossible to do fixing on a target print page at an appropriate fixing temperature. That is, a timing shift may occur between the fixing temperature to be controlled based on the temperature-regulate profile for print data created in advance and the page that actually passes through an image forming unit including a fixing unit.

SUMMARY OF THE INVENTION

According to one aspect of the present invention, an image forming apparatus including a temperature control unit configured to control a temperature of a fixing unit configured to fix a printing material on a sheet based on an amount of the printing material for image data of a page included in a print job, and an image forming unit, comprises: an acquisition unit configured to acquire the amount of the printing material for image data of each page included in the print job formed from a plurality of pages; and a transmission unit configured to transmit, to the image forming unit, image data of an Mth (M is a positive integer) page included in the print job after transmitting, to the temperature control unit, information of the amount of the printing material for the image data of the Mth (M is a positive integer) page included in the print job, which is acquired by the acquisition unit, wherein when another job to be executed with a priority higher than the print job is input during execution of the print job, the transmission unit transmits image data of a page included in the other job to the image forming unit after transmitting, to the image forming unit, the image data of the page corresponding to the information of the amount of the printing material transmitted to the temperature control unit.

The present invention provides a technique capable of appropriately adjusting a fixing temperature according to an amount of applied toner even when an interrupt function is executed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flowchart of fixing temperature control based on applied toner amount information;

FIGS. 10A and 10B are graphs showing examples of temperature control of a fixing unit at the time of interrupt printing;

FIG. 11 is a flowchart of applied toner amount information transfer control according to the second embodiment;

FIG. 12 is a graph showing an example of temperature control of a fixing unit at the time of interrupt printing according to the second embodiment;

FIG. 13 is a flowchart of applied toner amount information transfer control according to the third embodiment;

FIG. 15 is a graph showing an example of temperature control of a fixing unit at the time of interrupt printing according to the third embodiment.

DESCRIPTION OF THE EMBODIMENTS

Preferred embodiments of the present invention will now be described in detail with reference to the accompanying drawings. Note that the following embodiments are merely examples and are not intended to limit the technical scope of the present invention.

First Embodiment

A tandem color image forming apparatus will be exemplified below as an image forming apparatus according to the first embodiment of the present invention.

<System Configuration>

Figure 1:
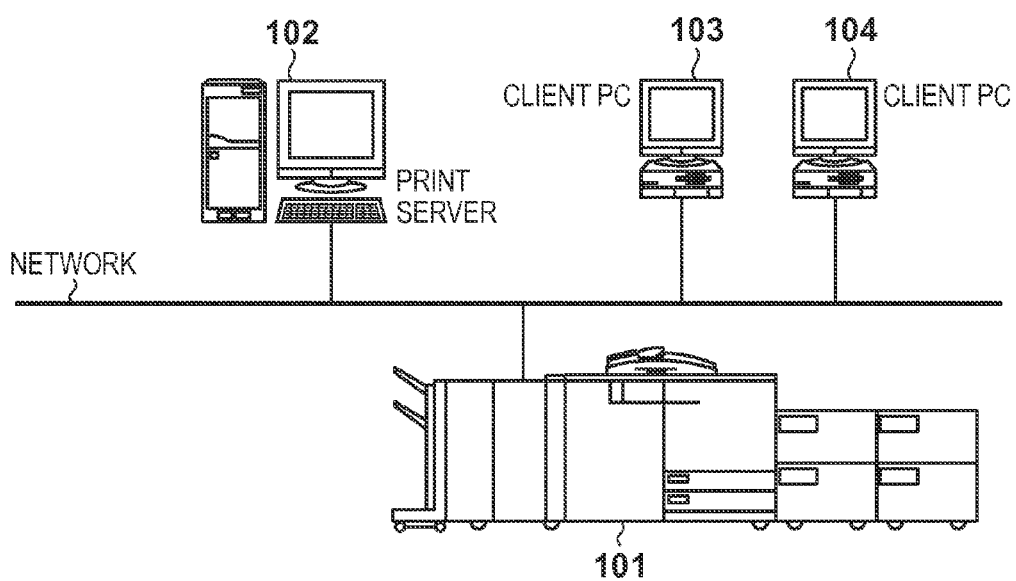
FIG. 1 is a view showing a system configuration including an image forming apparatus according to the first embodiment.

FIG. 1 is a view showing a system configuration including an electrophotographic image forming apparatus 101 according to the first embodiment.

The image forming apparatus 101 processes various kinds of input data, forms images on a printing medium such as a paper sheet, and outputs a printed product. A print server 102 is connected to the image forming apparatus 101 via a network. Client PCs 103 and 104 are connected to the image forming apparatus 101 via the network, like the print server 102.

Figure 2:
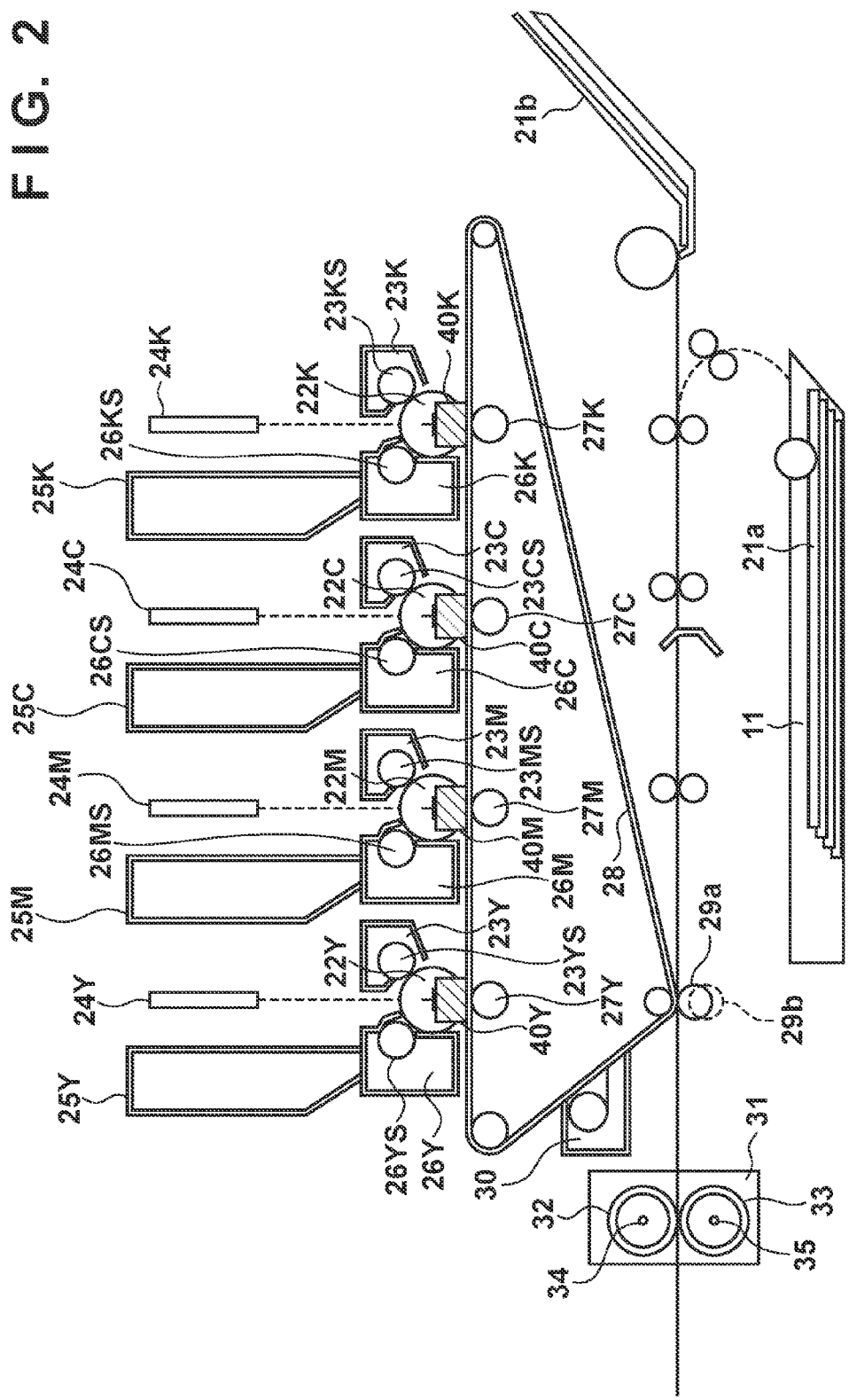
FIG. 2 is a sectional view of a tandem color image forming apparatus.

FIG. 2 is a sectional view of the tandem color image forming apparatus 101. The tandem color image forming apparatus 101 performs image formation by transferring a toner image (image formed by toners serving as printing materials) onto a printing medium (sheet) via an intermediate transfer material 28.

A charging unit includes photosensitive members 22Y, 22M, 22C, and 22K, and four charge injectors 23Y, 23M, 23C, and 23K configured to charge the respective photosensitive members for yellow (Y), magenta (M), cyan (C), and black (K).

The photosensitive members 22Y, 22M, 22C, and 22K rotate upon receiving driving forces transmitted from driving motors 40Y, 40M, 40C, and 40K, respectively. Referring to FIG. 2, the driving motors rotate the photosensitive members 22Y, 22M, 22C, and 22K, respectively, counterclockwise in accordance with an image forming operation.

An exposure unit irradiates the photosensitive members 22Y, 22M, 22C, and 22K with exposure light using scanner units 24Y, 24M, 24C, and 24K, and selectively exposes the surfaces of the photosensitive members 22Y, 22M, 22C, and 22K. Electrostatic latent images are thus formed on the photosensitive members.

A developing unit includes four developers 26Y, 26M, 26C, and 26K that perform development for Y, M, C, and K to visualize the electrostatic latent images on the photosensitive members. The developers are provided with sleeves 26YS, 26MS, 26CS, and 26KS, respectively. Note that the developers 26 are detachable.

A transfer unit transfers a single-color toner image from each photosensitive member 22 onto the intermediate transfer material 28. In FIG. 2, the intermediate transfer material 28 rotates clockwise. The single-color toner images are sequentially transferred onto the intermediate transfer material 28 as the photosensitive members 22Y, 22M, 22C, and 22K and primary transfer rollers 27Y, 27M, 27C, and 27K located on opposing sides rotate. This is called primary transfer. Note that when an appropriate bias voltage is applied to the primary transfer roller 27, and the photosensitive member 22 and the intermediate transfer material 28 are caused to have different rotation speeds, the single-color toner image can efficiently be transferred onto the intermediate transfer material 28.

The transfer unit also overlays the single-color toner images on the intermediate transfer material 28, and conveys the overlaid multicolor toner image to secondary transfer roller 29 as the intermediate transfer material 28 rotates. In addition, the printing medium 11 such as a paper sheet is conveyed from a paper feed tray to the secondary transfer roller 29 in a sandwiched state, and the multicolor toner image on the intermediate transfer material 28 is transferred onto the printing medium 11. At this time, an appropriate bias voltage is applied to the secondary transfer roller 29, and the toner image is electrostatically transferred. This is called secondary transfer. The secondary transfer roller 29 contacts the printing medium 11 at a position 29a during transfer of the multicolor toner image onto the printing medium 11, and separates to a position 29b after print processing.

A fixing unit is a functional unit that fuses and fixes, to the printing medium 11, the multicolor toner image transferred onto the printing medium 11. For this purpose, the fixing unit includes a fixing roller 32 that heats the printing medium 11, and a pressurizing roller 33 that presses the printing medium 11 against the fixing roller 32. The fixing roller 32 and the pressurizing roller 33 are formed to be hollow and incorporate heaters 34 and 35, respectively. A fixing device 31 causes the fixing roller 32 and the pressurizing roller 33 to convey the printing medium 11 holding the multicolor toner image, and applies heat and a pressure, thereby fixing the toner to the printing medium 11.

Note that a temperature sensor (not shown) is attached to the fixing unit, and the fixing unit is controlled to perform a fixing operation only when a temperature sufficient for fixing is confirmed. After that, the printing medium 11 after toner fixing is discharged to a discharge tray (not shown) by a discharge roller (not shown), and the image forming operation ends.

A cleaning unit 30 cleans toners remaining on the intermediate transfer material 28. Waste toners remaining after the four-color toner image formed on the intermediate transfer material 28 is transferred onto the printing medium 11 are removed from the intermediate transfer material 28 by cleaning and stored in a cleaner container.

<Arrangement of Image Forming Apparatus>

Figure 3:
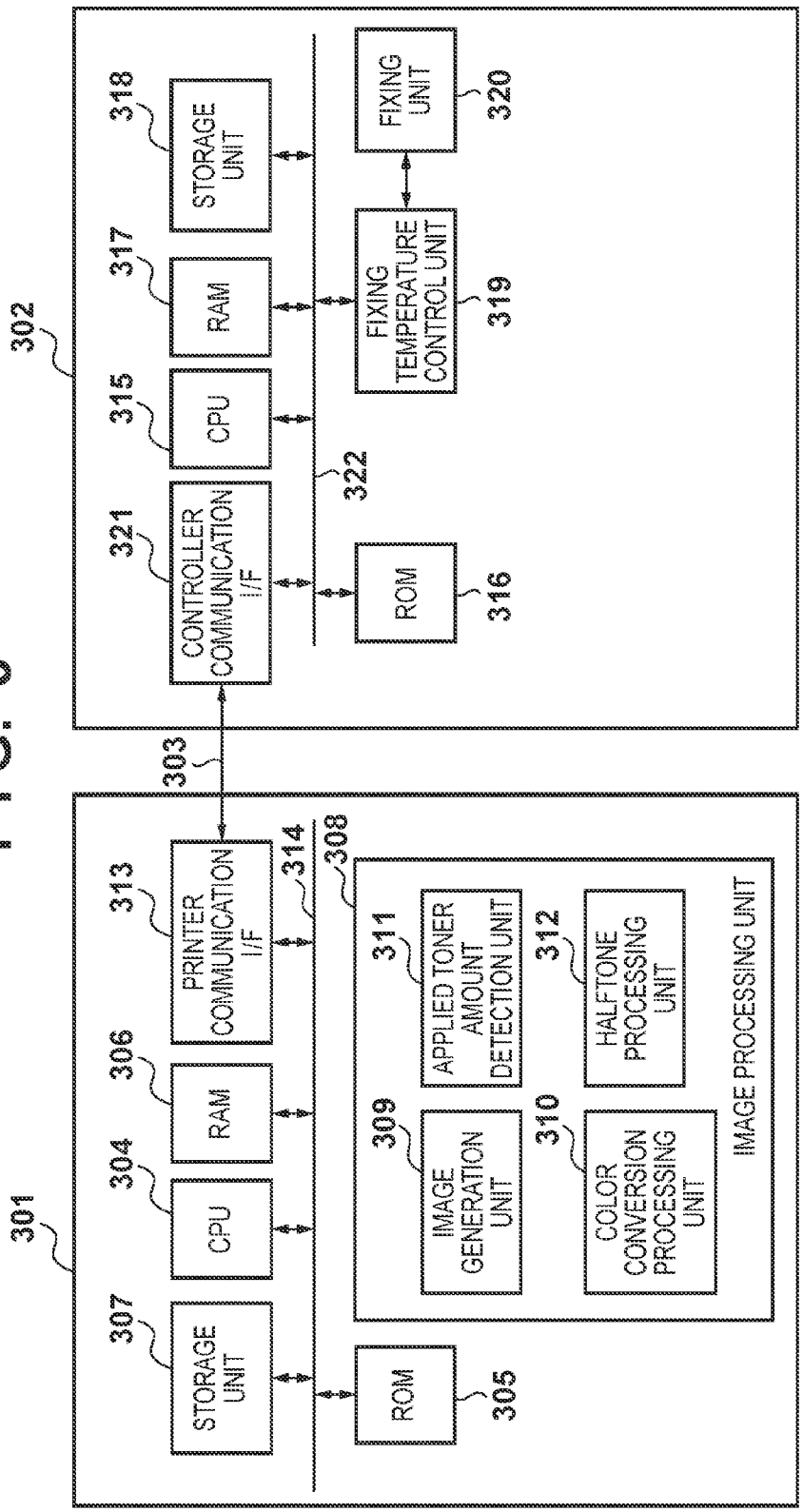
FIG. 3 is a block diagram of the arrangement of the image forming apparatus.

FIG. 3 is a block diagram of the arrangement of the image forming apparatus 101. The image forming apparatus 101 is roughly divided into a controller unit 301 (temperature control unit) and a print unit 302 (image forming unit). The controller unit 301 is a functional unit that receives print data from an external apparatus and generates image data (raster image data) to be provided to the print unit 302. The print unit 302 is a functional unit that forms an image on a printing medium such as a paper sheet based on the image data received from the controller unit 301.

Each of the controller unit 301 and the print unit 302 includes a CPU configured to execute programs, a ROM, and a RAM. Each CPU reads out a main program from the ROM and stores it in the RAM in accordance with an initial program stored in the ROM. The RAM is used to store programs or as the main memory for work.

An image generation unit 309 generates printable raster image data based on print data (print job) received from a client PC 103 or the like. The raster image data includes RGB data and attribute data representing the data attribute of each pixel. The image generation unit 309 may handle image data read by a reading unit (scanner) installed in the image forming apparatus 101 itself. The reading unit here can be a CCD (Charged Couple Device) reading unit or a CIS (Contact Image Sensor) reading unit. A processing unit that performs predetermined image processing for the read image data may also be provided. The image forming apparatus 101 may be configured to receive image data from an external reading unit via an interface (not shown), instead of including the reading unit in itself.

A color conversion processing unit 310 converts RGB data into CMYK in accordance with the toner colors, and generates CMYK data. At this stage, the image data represents the toner amounts of CMYK, and is expressed by, for example, values of 0 to 255 (8-bit value) on a pixel basis. For example, if the values of all colors are "0", this represents disuse of toners. The larger the value is, the higher the density is. A value "255" represents the highest density.

An applied toner amount detection unit 311 detects (derives) the amount of applied toner (printing material amount) from the CMYK data generated by the color conversion processing unit 310. In the following explanation, an amount of applied toner is expressed as a ratio (unit:%) to the maximum value of the toner weight per unit area as 100%. For each color on a pixel basis, a value "255" corresponds to an amount of applied toner of 100%. The sum of the amounts of applied toners of CMYK represents the amount of applied toner of the pixel.

For example, when two colors each having the maximum value (100%) are overlaid, the amount of applied toner of the pixel is 200%. Note that each color has tonality and can take a value within the range of 0% to 100%. For example, in an image that makes full use of four CMYK toners in a full-color print mode, the maximum amount of applied toner is large. On the other hand, for example, in a monochrome image using K toner alone, the maximum amount of applied toner is smaller. The applied toner amount detection unit 311 calculates the amount of applied toner per unit area in a whole page and detects the maximum value as applied toner amount information.

A halftone processing unit 312 performs halftone processing for each of the CMYK data generated by the color conversion processing unit 310. As a detailed arrangement, the halftone processing unit performs screen processing or error diffusion processing. In the screen processing, N-ary processing is performed using a plurality of predetermined dither matrices and input image data. In the error diffusion processing, N-ary processing is performed by comparing input image data with a predetermined threshold, and the difference between the input image data and the threshold at that time is diffused to peripheral pixels to be subsequently subjected to N-ary processing.

A printer communication I/F unit 313 and a controller communication I/F unit 321 are I/F units configured to do communication between the controller unit 301 and the print unit 302. Information to be communicated here includes various kind of control signals, the applied toner amount information detected by the applied toner amount detection unit 311, and the like as well as image data (raster image data) to be printed.

A fixing temperature control unit 319 calculates a target fixing temperature (for example, minimum temperature necessary for fixing) in accordance with the applied toner amount information transferred from the controller unit 301 to the print unit 302. Note that the method of calculating, from the applied toner amount information, the minimum temperature necessary to fix the page of the amount of applied toner will be described later with reference to FIG. 5. The fixing temperature control unit 319 performs temperature control of the fixing unit 320 based on the calculated target fixing temperature.

<Fixing Temperature Decision Based on Amount of Applied Toner>

As described above, an amount of applied toner means a toner amount per unit area of an image. To fix toner on a printing medium without any fixing failure, the temperature of the fixing unit needs to be set to a fixing temperature capable of reliably fixing a pixel (or pixel block) whose amount of applied toner has the maximum value in the target page. Since the maximum amount of applied toner changes depending on image data to be printed, the temperature necessary for fixing also changes between image data. More specifically, the larger the maximum amount of applied toner is, the higher the necessary temperature is.

Figure 5:
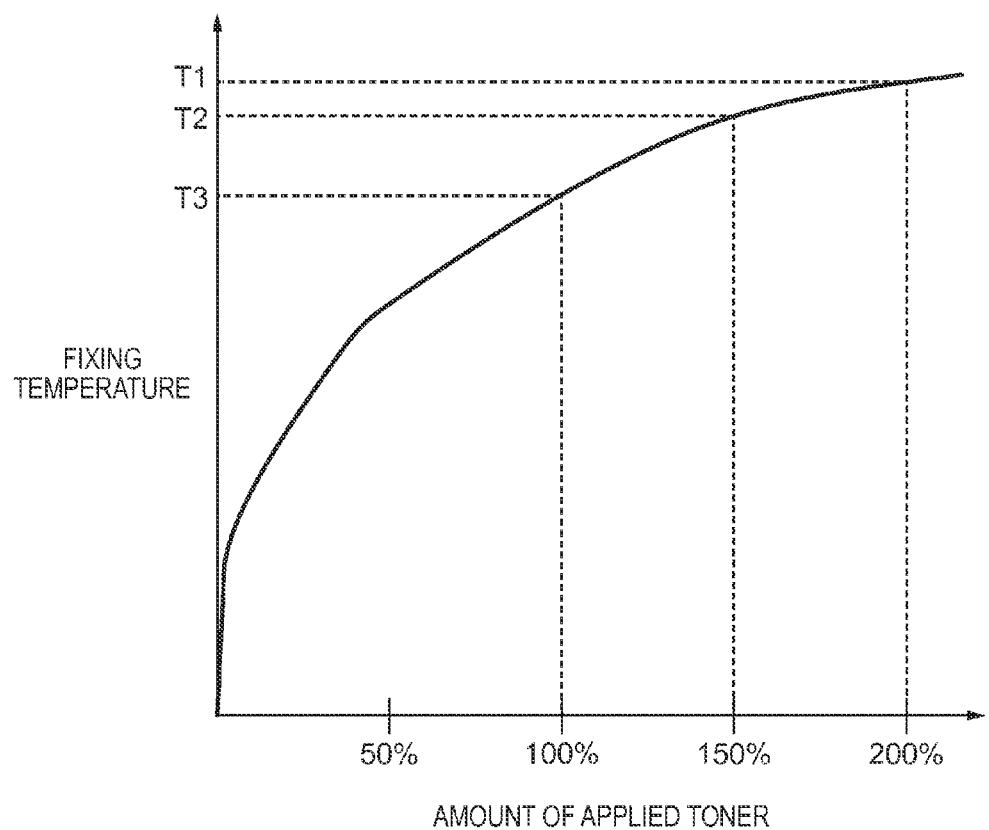
FIG. 5 is a graph showing the relationship between an amount of applied toner and a fixing temperature.

FIG. 5 is a graph showing the relationship between the amount of applied toner and the fixing temperature. The abscissa represents the amount of applied toner, and the ordinate represents the temperature necessary for fixing. For example, when the detection result of the applied toner amount detection unit is 200%, the minimum temperature necessary for fixing is T1. When the detection result is 100%, the minimum temperature necessary for fixing the target page is T3, as can be seen.

If the temperature has risen to the temperature capable of fixing the maximum amount of applied toner appearing in a print page, a problem such as a fixing failure does not occur in the whole image. It is therefore possible to obtain the minimum temperature necessary for fixing a page to be output based on the applied toner amount information detected by the above-described applied toner amount detection unit.

Note that since the relationship (relationship data) shown in the graph of FIG. 5 is stored in a storage unit 307 or a RAM 306 as, for example, a lookup table (LUT) because it is used in temperature control of the fixing unit 320. In addition, the information amount may be reduced by storing the relationship shown in the graph of FIG. 5 after normalization.

<Operation of Image Forming Apparatus>

Figure 6:
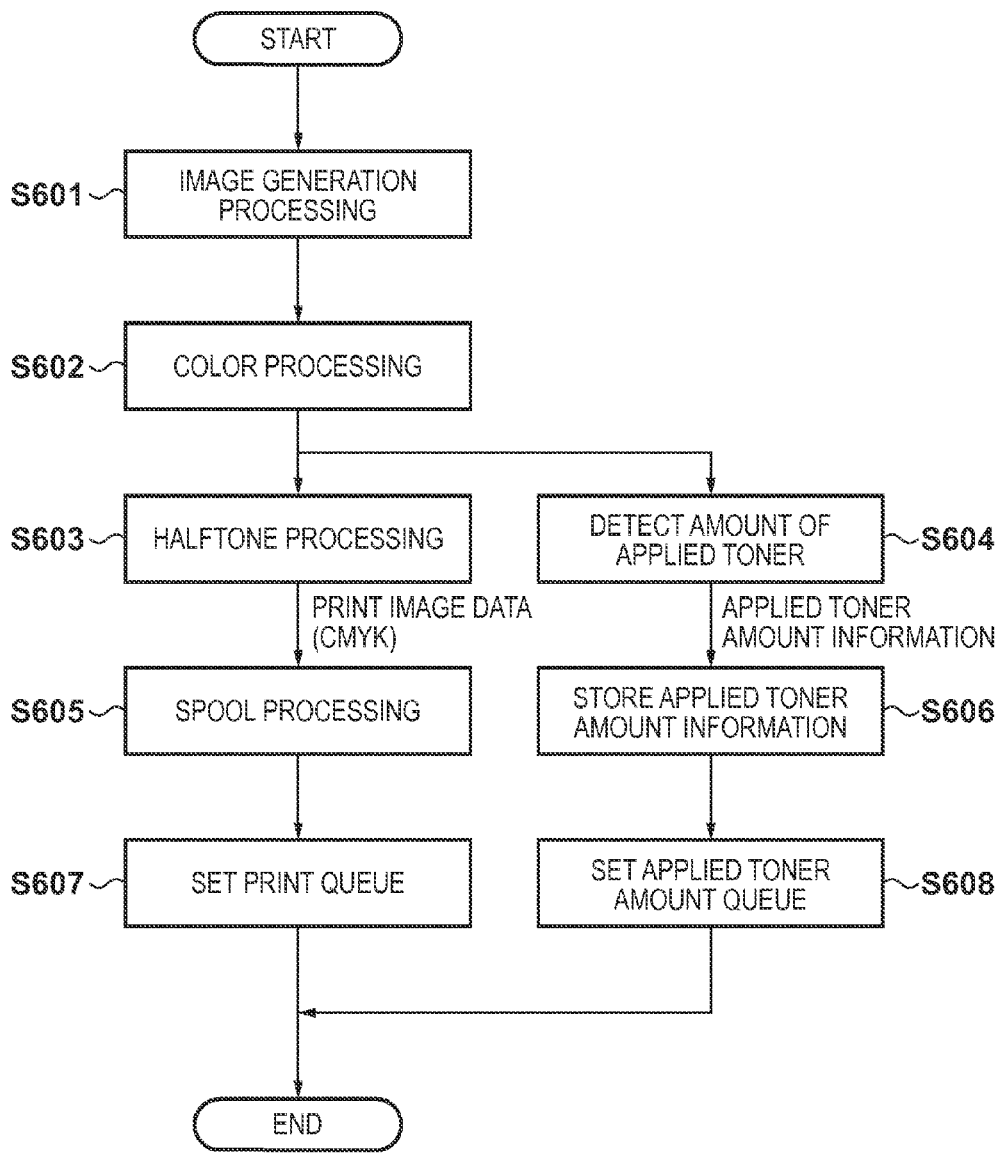
FIG. 6 is a flowchart of image data spool processing.

FIG. 6 is a flowchart for explaining image processing in the controller unit 301. In particular, the processing sequence of applied toner amount detection characteristic to the first embodiment will be described. The procedure shown in FIG. 6 is implemented by causing the CPU 304 to execute a control program and operate an image processing unit 308.

In step S601, the image generation unit 309 generates raster image data of each page included in print data. As described above, RGB data and attribute data representing the data attribute of each pixel are output on a pixel basis as the raster image data.

In step S602, the color conversion processing unit 310 converts the RGB data into CMYK in accordance with the toner colors, and generates CMYK data and attribute data.

In step S603, the halftone processing unit 312 performs halftone processing (N-ary processing) for the CMYK data by a method using screen processing or error diffusion processing, and generates print image data (halftone image data).

In step S605, the CPU 304 performs spool processing of temporarily storing the print image data obtained as the result of halftone processing in step S603 in the RAM 306.

In step S607, the CPU 304 registers, in a print queue, page information data representing the print image data spooled in step S605. Here, the print queue is assumed to be implemented in the RAM 306. However, a memory dedicated to the print queue may be used. Page information data includes, for example, the identification ID, paper size, and paper type of corresponding print image data.

In step S604, the applied toner amount detection unit 311 detects the amount of applied toner based on the CMYK data. This processing may be executed in parallel to the halftone processing of step S603. Note that the applied toner amount detection is performed for CMYK continuous tone image data due to the following reason. That is, the amount of applied toner can be calculated more accurately by performing applied toner amount detection for CMYK data that is continuous tone image data than by performing applied toner amount detection for a halftone image. The amount of applied toner may be calculated from an image after halftoning, as a matter of course.

In step S606, the CPU 304 stores, in the RAM 306, the applied toner amount information generated in step S604.

In step S608, the CPU 304 registers, in an applied toner amount queue, toner information data representing the applied toner amount information stored in step S606. Here, the applied toner amount queue is assumed to be implemented in the RAM 306. However, a memory dedicated to the applied toner amount queue may be used. Toner information data includes, for example, the identification ID of corresponding print image data and applied toner amount information representing the amounts of printing materials.

Figure 4:
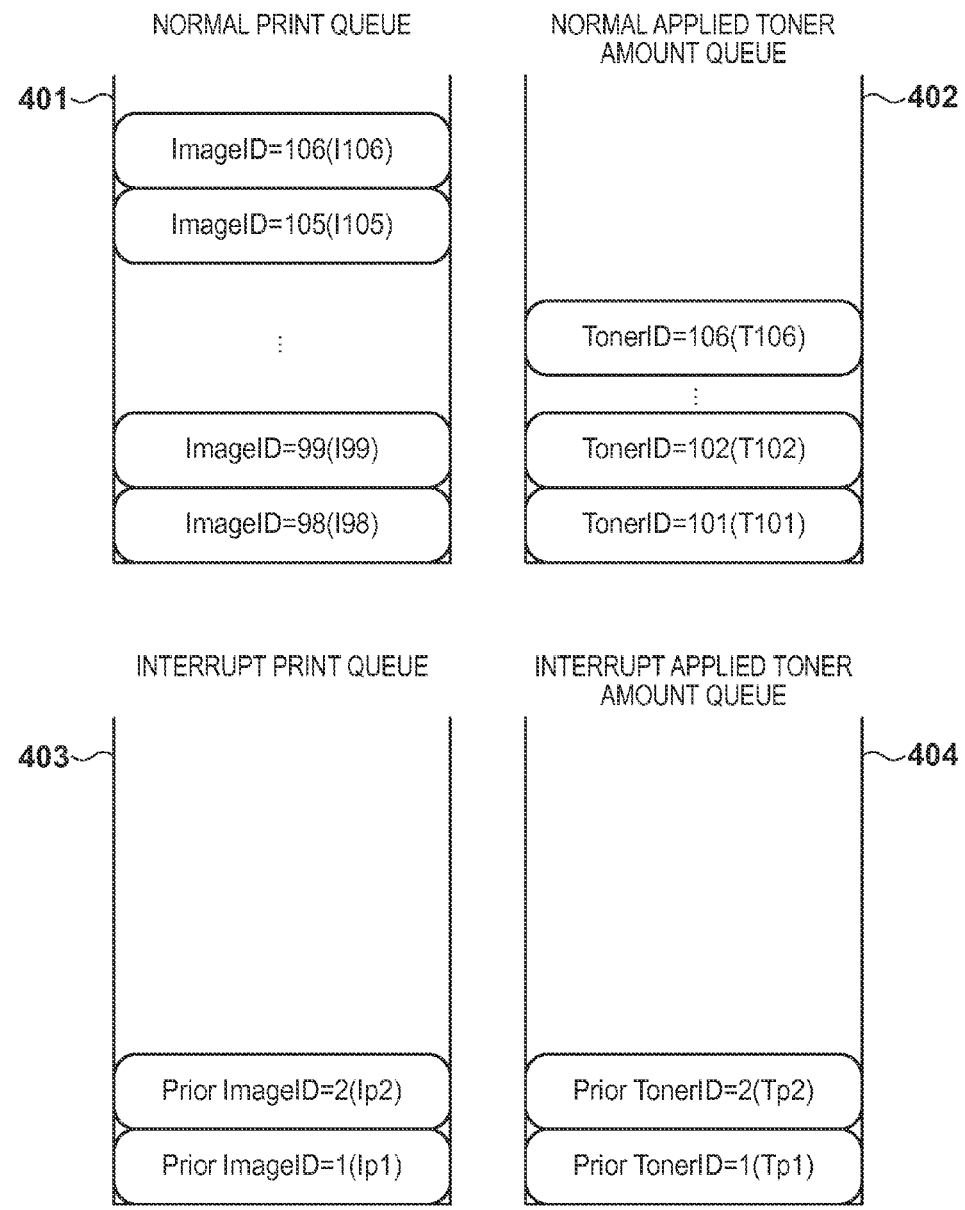
FIG. 4 is a view for explaining a print queue and an applied toner amount queue.

FIG. 4 is a view for explaining the print queue and the applied toner amount queue used for transmission order control. The print queue includes a normal print queue 401 and an interrupt print queue 403. Page information data (image data) corresponding to a normal print job or copy job (to be referred to as a normal job hereinafter) is registered in the normal print queue 401. FIG. 4 shows a state in which nine pieces of page information data (I98 to I106) generated based on normal jobs are registered in the normal print queue 401.

On the other hand, page information data corresponding to a print job or copy job (to be referred to as an interrupt job hereinafter) input using the interrupt function is registered in the separate interrupt print queue 403 so as to execute the job with a high priority as compared to the above-described normal job. FIG. 4 shows a state in which two pieces of page information data (Ip1 and Ip2) generated based on interrupt jobs are registered in the interrupt print queue 403.

The applied toner amount queue includes a normal applied toner amount queue 402 and an interrupt applied toner amount queue 404. Toner information data corresponding to a normal print job or copy job is registered in the normal applied toner amount queue 402. On the other hand, toner information data corresponding to a print job or copy job input using the interrupt function is registered in the interrupt applied toner amount queue 404. FIG. 4 shows a state in which six pieces of toner information data (T101 to T106) generated based on normal jobs are registered in the normal applied toner amount queue 402. Here, a number included in toner information data (ID) represents a page number, and toner information data corresponds to page information data (ID) having the same number.

Note that three pieces of toner information data (T98 to T100) corresponding to three pieces of page information data (I98 to I100) are not illustrated in FIG. 4. This is because the pieces of toner information data (T98 to T100) are notified to the print unit 302 while preceding the corresponding page information data (I98 to I100) by N pages, and therefore already deleted from the queue. That is, page information data of the Mth (M is a positive integer) page and toner information data of the (M+N)th (N is a positive integer) page are transmitted. In other words, after toner information data of the Mth page is transmitted, page information data of the Mth page is transmitted. Note that the toner information data is notified to the print unit 302 before the corresponding page information data to appropriately perform temperature control of the fixing temperature control unit 319. This will be described later with reference to FIG. 9 (step S903).

Note that in the above description, each queue is divided into two types, that is, a queue (first transmission queue) corresponding to a normal job and a queue (second transmission queue) corresponding to an interrupt job. However, they may be formed as one queue. In this case, each page information data or toner information data is given a flag to identify whether the data corresponds to a normal job or an interrupt job. When extracting data from the queue, priority control of the processing order is performed by referring to the flag.

<Applied Toner Amount Information Transfer Control>

Figure 7:
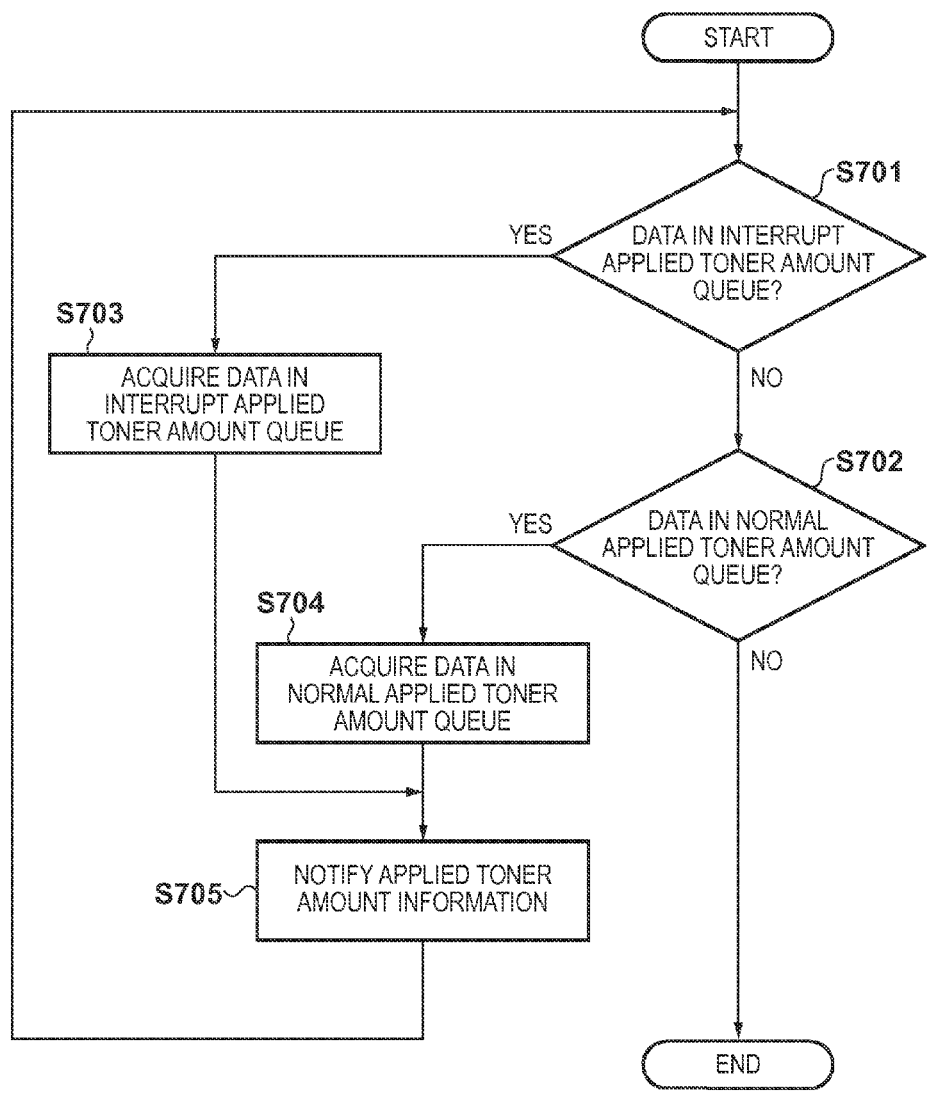
FIG. 7 is a flowchart of applied toner amount information transfer control.

FIG. 7 is a flowchart of applied toner amount information transfer control. More specifically, this flowchart shows processing of causing the controller unit 301 to notify the print unit 302 of applied toner amount information. Each step is implemented by, for example, causing the CPU 304 of the controller unit 301 to execute a control program.

In step S701, the CPU 304 confirms whether toner information data is stored in the interrupt applied toner amount queue 404. If no toner information data is stored, the process advances to step S702. If toner information data is stored, the process advances to step S703.

In step S702, the CPU 304 confirms whether toner information data is stored in the normal applied toner amount queue 402. If no toner information data is stored, the processing ends because no information data to be notified exists. If toner information data is stored, the process advances to step S704.

In step S703, the CPU 304 acquires the toner information data from the interrupt applied toner amount queue 404. When the toner information data is acquired, the acquired toner information data is deleted from the queue. On the other hand, in step S704, the CPU 304 acquires the toner information data from the normal applied toner amount queue 402. When the toner information data is acquired, the acquired toner information data is deleted from the queue.

In step S705, using the toner information data acquired in step S704 or S703, the CPU 304 decides applied toner amount information to be notified to the print unit 302. The CPU 304 transfers the decided applied toner amount information to the print unit 302 via the communication line 303.

With the above-described processing, when a print job is input using the interrupt function, it is possible to temporarily interrupt transfer of applied toner amount information corresponding to a normal print job and notify the print unit 302 of the applied toner amount information of the interrupt job.

<Print Image Data Transfer Control>

Figure 8:
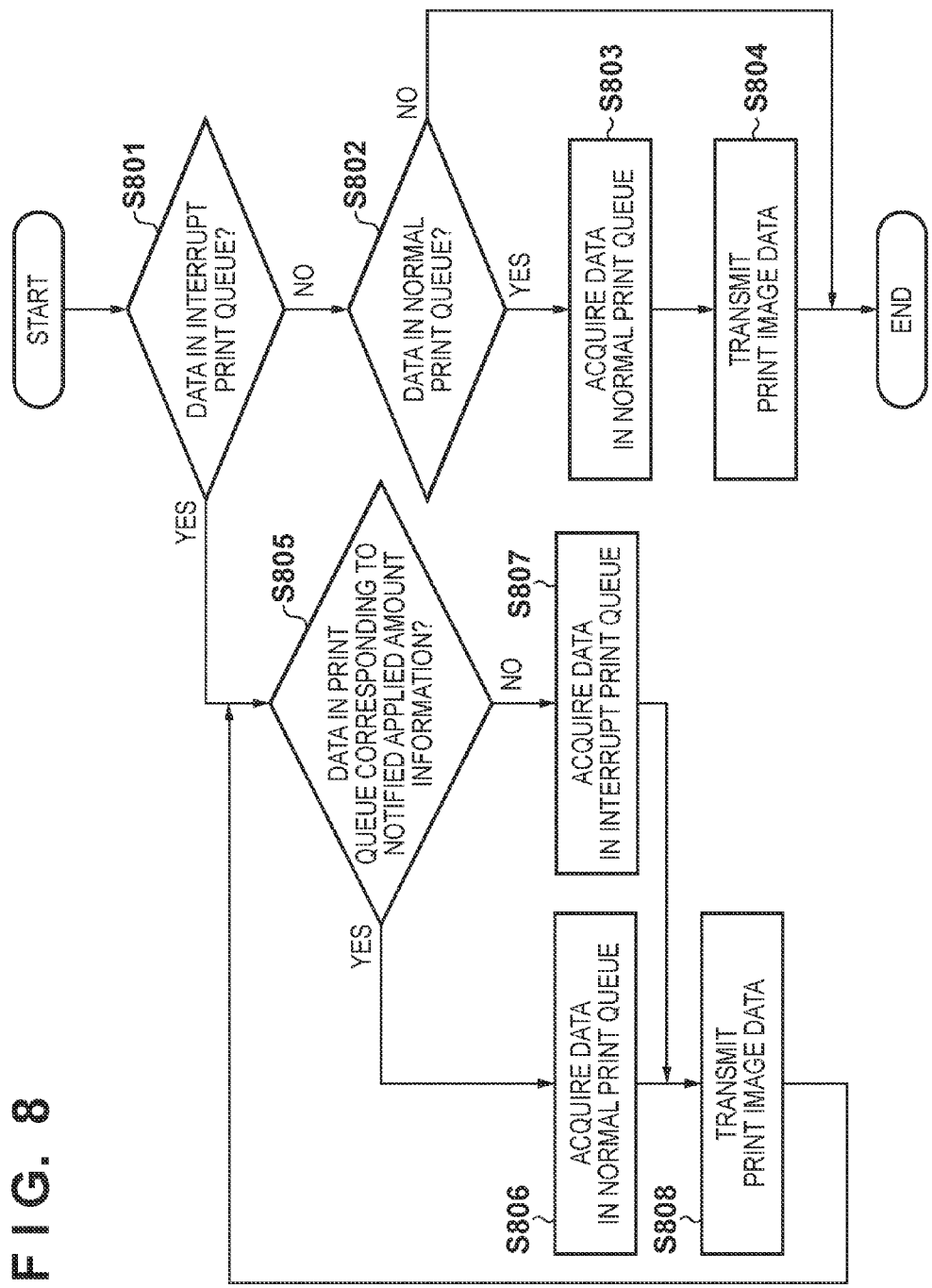
FIG. 8 is a flowchart of print image data transfer control.

FIG. 8 is a flowchart of print image data transfer control. More specifically, this flowchart shows processing of causing the controller unit 301 to notify the print unit 302 of print image data. Each step is implemented by, for example, causing the CPU 304 of the controller unit 301 to execute a control program.

In step S801, the CPU 304 confirms whether page information data is stored in the interrupt print queue 403. If no page information data is stored, the process advances to step S802. If page information data is stored, the process advances to step S805.

In step S802, the CPU 304 confirms whether page information data is stored in the normal print queue 401. If no page information data is stored, the processing ends. If page information data is stored, the process advances to step S803.

In step S803, the CPU 304 acquires the page information data from the normal print queue 401. When the page information data is acquired, the acquired page information data is deleted from the queue.

In step S804, using the page information data acquired in step S803, the CPU 304 decides print image data to be transferred to the print unit 302. The CPU 304 transfers the decided print image data to the print unit 302 via the communication line 303.

In step S805, the CPU 304 confirms whether page information data corresponding to applied toner amount information already notified to the print unit 302 exists in the normal print queue. This confirmation is done based on, for example, toner information data (ID) and page information data (ID) match. Upon determining that the page information data exists, the process advances to step S806 to acquire the page information data from the normal print queue 401. Upon determining that the page information data does not exist, the process advances to step S807 to acquire the page information data from the interrupt print queue 403. When the data is acquired, the acquired data is discarded from the queue. In step S808, the CPU 304 transfers the print image data to the print unit 302 via the communication line 303, as in step S804.

With the above-described processing, even when print image data is registered in the interrupt print queue, processing of a normal job corresponding to a page whose applied toner amount information has already been transmitted to the print unit 302 can be continued. It is therefore possible to synchronously transfer applied toner amount information and print image data corresponding to interrupt printing.

<Fixing Temperature Control Based on Amount of Applied Toner>

FIG. 9 is a flowchart of fixing temperature control based on applied toner amount information. Each step is implemented by, for example, causing a CPU 315 of the print unit 302 to execute a control program. Note that a description will be made here assuming that, in the image forming apparatus 101, the controller unit 301 notifies the print unit 302 in advance of the amount of applied toner of a page to be fixed three pages after a page currently under fixing processing. Immediately after the start of printing, when the temperature of the fixing unit is controlled after detecting the amount of applied toner, the image forming apparatus cannot immediately react to a print instruction from the user, resulting in low productivity. To prevent this, fixing temperature control on a page basis is not performed for pages before a predetermined page after the start of printing, and fixing is performed at a fixing temperature capable of fixing a maximum amount of applied toner possible in the image forming apparatus 101. The fixing temperature control on a page basis is performed from the image data of the predetermined page after the start of printing.

In step S901, the CPU 315 determines whether a print instruction is received from the controller unit 301. If an instruction is received, the process advances to step S902. If no instruction is received, the processing ends.

In step S902, the CPU 315 determines whether applied toner amount information is received. If no applied toner amount information is received, the process advances to step S904. If applied toner amount information is received, the process advances to step S903. Note that the CPU 315 may control to advance the process to step S904 independent of the presence/absence of applied toner amount information reception for pages before a predetermined page after the start of printing, as described above. This control makes it possible to raise the fixing temperature before notification of applied toner amount information and increase the productivity of print processing.

In step S903, the CPU 315 calculates, based on the received applied toner amount information, a minimum temperature necessary to fix a subsequent target page. For example, the minimum temperature necessary to fix the target page is calculated using three (N) pieces of subsequent applied toner amount information as well as the fixing temperature of the page currently under printing. Exemplary processing will be described later with reference to FIGS. 10A and 10B. On the other hand, in step S904, the CPU 315 sets a preset fixing temperature, for example, a fixing temperature capable of fixing a maximum amount of applied toner possible in the image forming apparatus 101.

In step S905, the CPU 315 controls the temperature of the fixing unit 320 based on the current fixing temperature and the fixing temperature of the control target page decided in step S903. More specifically, if necessary to reach the target temperature up to the control target page, the CPU 315 controls to raise the temperature of the fixing unit 320. On the other hand, if it is possible to reach the target temperature even when the fixing temperature is lowered, the CPU 315 controls to lower the temperature of the fixing unit 320.

In step S906, the CPU 315 determines whether pages to be printed have ended. If the pages have not ended yet, the processing from step S901 is repeated. With the above-described processing, the fixing unit 320 can perform fixing at a fixing temperature suitable for each print image data.

FIGS. 10A and 10B are graphs showing examples of temperature control of the fixing unit 320 at the time of interrupt printing. The abscissa represents time, and the ordinate represents the fixing temperature when fixing print image data. Note that the amount of applied toner is shown as a percentage under each page number.

FIG. 10A exemplifies the amount of applied toner of each page included in a normal job and fixing temperature control for each page. FIG. 10A particularly shows an example of fixing temperature control for the amounts of applied toner of 98th to 106th pages (page IDs=98 to 106). The amount of applied toner is 200%, that is, exceeds 100% for the 98th and 103rd to 105th pages. The amounts of applied toner of the remaining pages are 100%.

In the image forming apparatus 101 according to the first embodiment, the amount of applied toner and the minimum temperature necessary for fixing have the relationship as shown in FIG. 5. That is, the temperature necessary for fixing an image whose amount of applied toner is 200% is T1. The temperature necessary for fixing an image whose amount of applied toner is 100% is T3.

As described above, applied toner amount information is transferred to the print unit 302 (fixing temperature control unit 319) while preceding corresponding page information data by a predetermined number of pages (three pages here). That is, for example, at the point of time when the formed image of the print image data of page 98 is fixed, the print unit 302 has already been notified of the applied toner amount information of at least pages 99 to 101. For this reason, the current (page 98) temperature of the fixing unit 320 is set to T1 or more. On the other hand, the target temperature is T3, and the fixing temperature control unit 319 determines that the fixing temperature can be lowered after fixing page 98.

Assume that an interrupt job shown in FIG. 4 is input when the formed image of the print image data of page 98 is being fixed. FIG. 10B exemplifies the amount of applied toner of each page and fixing temperature control for each page when the interrupt job is input.

The controller unit 301 first controls the applied toner amount information notification order of the interrupt job in accordance with the above-described processes of steps S701 to S705. More specifically, after the already transmitted applied toner amount information (T101), pieces of applied toner amount information (Tp1 and Tp2) corresponding to the print image data (Ip1 and Ip2) of the interrupt job are notified. After that, applied toner amount information (T102) corresponding to page 102 is notified.

In parallel, print image data transfer order control is performed in accordance with the processes of steps S801 to S808. More specifically, print image data (I99 to I101) corresponding to already notified applied toner amount information (T99 to T101) are transferred. After that, the print image data (Ip1 and Ip2) of the interrupt job are transferred.

The print unit 302 controls the fixing temperature in accordance with the processes of steps S901 to S906. More specifically, after fixing the formed image of the print image data of page 100, the pieces of applied toner amount information (T99 to T101) corresponding to the interrupt job indicate 200%. For this reason, control is performed to raise the temperature to the temperature (T1) capable of fixing the print image data (Ip1 and Ip2) of the interrupt job. In FIG. 10B, control is performed to raise the temperature even during fixing processing of the print image data (I101) so that the temperature (T1) is attained at the start of fixing of the print image data (Ip1).

As described above, according to the first embodiment, the fixing temperature can appropriately be adjusted in accordance with the amount of applied toner. In particular, the fixing temperature can more efficiently be adjusted even when processing a job input by the interrupt function.

Second Embodiment

In the second embodiment, a form that can more efficiently control the temperature of a fixing unit 320 will be described. Especially, control in a case where the fixing temperature controlled in accordance with a preceding job under printing is largely different from the fixing temperature corresponding to the applied toner amount information of an interrupt job will be explained. The arrangement of the image forming apparatus and processing up to spooling of print image data are almost the same as in the first embodiment (FIG. 6), and only different portions will be described.

FIG. 11 is a flowchart of applied toner amount information transfer control according to the second embodiment. More specifically, this flowchart shows processing of notifying a print unit 302 of applied toner amount information.

In the second embodiment, when toner information data is stored in an interrupt applied toner amount queue 404 in step S1101, the process advances to step S1106 to be described below, unlike the first embodiment (FIG. 7). The processes of steps S1101 to S1105 are the same as those described concerning steps S701 to S705 of FIG. 7, and a description thereof will be omitted.

In step S1106, a CPU 304 compares the value of applied toner amount information registered in a normal applied toner amount queue and to be acquired next and the value of applied toner amount information registered in the interrupt applied toner amount queue and to be acquired next, and determines whether close values exist. For example, the CPU determines whether the difference is smaller than a predetermined value. Upon determining that the values are close (difference is smaller than a predetermined value), the process advances to step S1103 to acquire the toner information data from an interrupt applied toner amount queue 404. Upon determining that the values are not close, the process advances to step S1104 to acquire the toner information data from a normal applied toner amount queue 402.

Note that in step S1106, the comparison may be done using all pieces of toner information data registered in the normal applied toner amount queue, and the process may be forcibly advanced to step S1103 even when there exist no close values. Alternatively, in step S1106, if no close values exist for a predetermined number of continuous pages (for example, when the difference is equal to or larger than a predetermined value continuously for 10 pages), the process may be forcibly advanced to step S1103. This control can limit the time to wait for image formation of the interrupt job.

In step S1106, two pieces of continuous toner information data that can be acquired from the normal applied toner amount queue next may be used, and the process may advance to step S1103 only when both have close values. This control can make a change in the fixing temperature small and further reduce power consumption.

FIG. 12 is a graph showing an example of temperature control of the fixing unit 320 at the time of interrupt job processing according to the second embodiment. The abscissa represents time, and the ordinate represents the fixing temperature when fixing print image data. Note that the amount of applied toner is shown as a percentage under each page number.

As in the first embodiment, applied toner amount information is transferred to a print unit 302 (fixing temperature control unit 319) while preceding corresponding print image data by a predetermined number of pages (three pages here). That is, for example, at the point of time when the formed image of the print image data of page 98 is fixed, the print unit 302 has already been notified of the applied toner amount information of at least pages 99 to 101. For this reason, the current (page 98) temperature of the fixing unit 320 is set to T1 or more. On the other hand, the target temperature is T3, and the fixing temperature control unit 319 determines that the fixing temperature can be lowered after fixing page 98.

Assume that an interrupt job shown in FIG. 4 is input when the formed image of the print image data of page 98 is being fixed. In this case, when the process of step S1106 is executed, the applied toner amount information and print image data of the interrupt job are transmitted to the print unit 302 before transmission of the print image data of page 103. As a result, print processing of the interrupt job is executed before print processing of page 103.

As described above, according to the second embodiment, even when an interrupt job including print image data whose amount of applied toner is largely different from print image data currently under fixing processing is input by the interrupt function, the job can appropriately be processed.

Third Embodiment

In the third embodiment, a form that can more efficiently control the temperature of a fixing unit 320 will be described. Especially, control in a case where the fixing temperature controlled in accordance with a preceding job under printing is close to the fixing temperature corresponding to the applied toner amount information of an interrupt job will be explained. The arrangement of the image forming apparatus and processing up to spooling of print image data are almost the same as in the second embodiment (FIG. 11), and only different portions will be described.

FIG. 13 is a flowchart of applied toner amount information transfer control according to the third embodiment. More specifically, this flowchart shows processing of notifying a print unit 302 of applied toner amount information.

In the third embodiment, after step S1303, the process advances to step S1307 to be described below, unlike the second embodiment (FIG. 11). The processes of steps S1301 to S1306 are the same as those described concerning steps S1101 to S1106 of FIG. 11, and a description thereof will be omitted.

In step S1307, a CPU 304 compares applied toner amount information corresponding to a page scheduled to form an image next and applied toner amount information corresponding to toner information data acquired in step S1303. If the values are not close as the result of comparison, the process advances to step S1305 to notify of the applied toner amount information corresponding to the toner information data acquired in step S1303. Upon determining that the values are close, the process advances to step S1308.

In step S1308, the CPU 304 notifies the print unit 302 of a duplication instruction of the applied toner amount information of the next page via a communication line 303. The CPU 304 also sets a flag (not shown) representing that the interrupt is to be performed immediately in print image data transfer control to ON.

Figure 14:
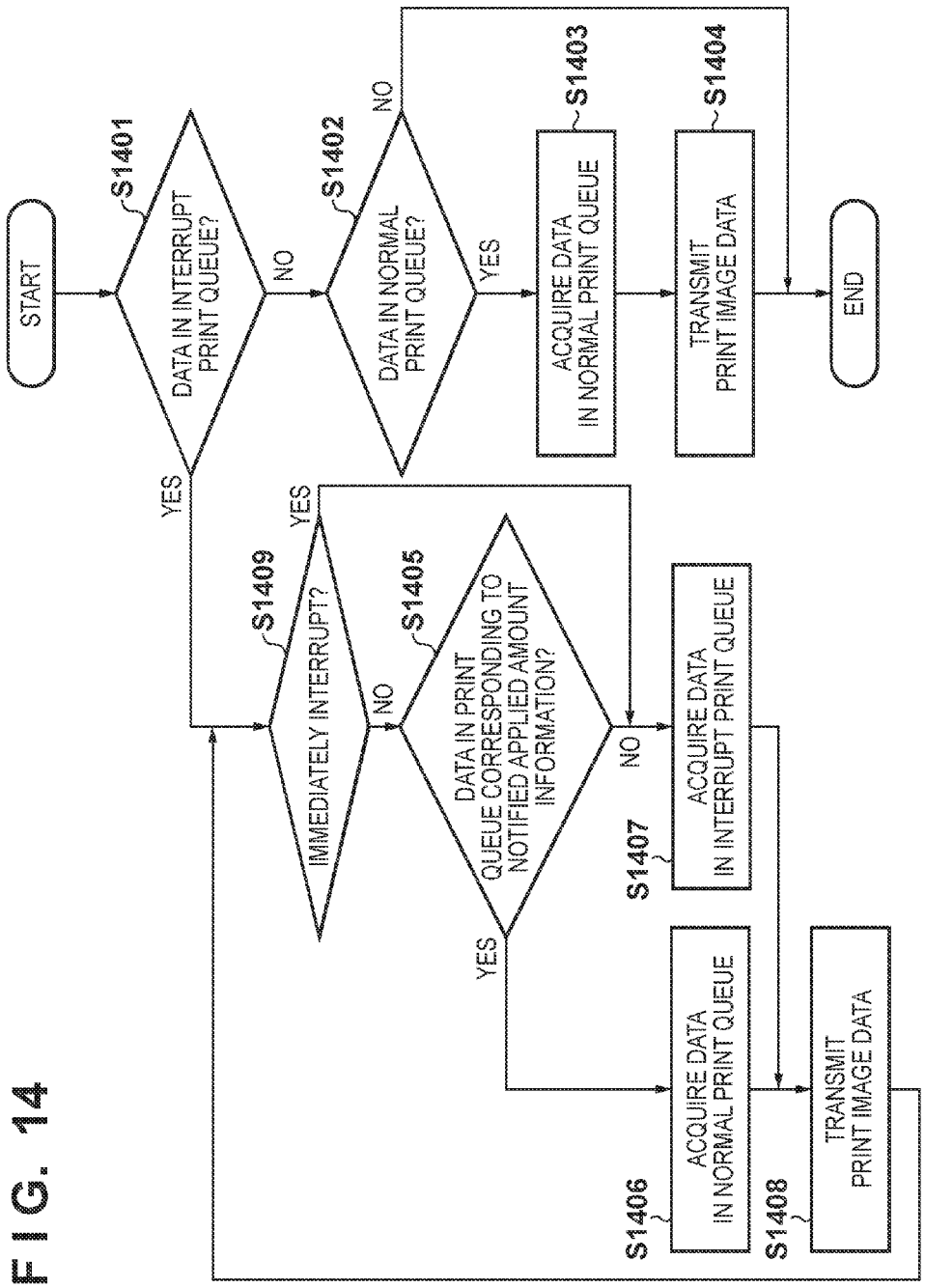
FIG. 14 is a flowchart of print image data transfer control according to the third embodiment.

FIG. 14 is a flowchart of print image data transfer control according to the third embodiment. In the third embodiment, upon determining in step S1401 that page information data is stored in an interrupt print queue 403, the process advances to step S1409 to be described below, unlike the first embodiment (FIG. 8). The processes of steps S1401 to S1408 are the same as those described concerning steps S801 to S808 of FIG. 8, and a description thereof will be omitted.

In step S1409, the CPU 304 confirms the state of the flag representing that the interrupt is to be performed immediately. If the flag is OFF, the process advances to step S1405. If the flag is ON, the process advances to step S1407, and the flag is updated to off.

FIG. 15 is a graph showing an example of temperature control of the fixing unit 320 at the time of interrupt job processing according to the third embodiment. The abscissa represents time, and the ordinate represents the fixing temperature when fixing print image data. Note that the amount of applied toner is shown as a percentage under each page number.

As in the first embodiment, applied toner amount information is transferred to the print unit 302 (fixing temperature control unit 319) while preceding corresponding print image data by a predetermined number of pages (three pages here). That is, for example, at the point of time when the formed image of the print image data of page 103 is fixed, the print unit 302 has already been notified of the applied toner amount information of at least pages 104 to 106. For this reason, the current (page 103) temperature of the fixing unit 320 is set to T1 or more. Since the target temperature is T1, it is determined to maintain the fixing temperature at the current temperature.

Assume that an interrupt job shown in FIG. 4 is input when the formed image of the print image data of page 103 is being fixed. In this case, when the processes of step S1307 and S1409 are executed, the print image data (Ip1 and Ip2) of the interrupt job are transmitted to the print unit 302. That is, this is because applied toner amount information corresponding to the print image data of the interrupt job is detected as 200%, and the applied toner amount information of page 104 scheduled to form an image next is also 200%. As a result, print processing of the print image data of the interrupt job is executed immediately after print processing of page 103.

As described above, according to the third embodiment, even when an interrupt job including print image data whose amount of applied toner is close to that of print image data currently under fixing processing is input by the interrupt function, the job can appropriately be processed. More specifically, the response of the interrupt job can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-256441, filed Dec. 11, 2013 which is hereby incorporated by reference herein in its entirety.

What is claimed is:

1. An image forming apparatus including an image forming unit configured to form a toner image on a sheet based on image data of a page included in a print job, and a temperature control unit configured to control a temperature of a fixing unit when the fixing unit fixes a toner image for the image data of the page on a sheet based on an amount of applied toner for the image data of the page, comprising:

an acquisition unit configured to acquire the amount of the applied toner for image data of each page included in the print job formed from a plurality of pages; and a transmission unit configured to transmit, to said image forming unit, image data of an Mth (M is a positive integer) page included in the print job after transmitting, to the temperature control unit, information of the amount of the applied toner for the image data of the Mth (M is a positive integer) page included in the print job, which is acquired by said acquisition unit, wherein, if another job, which is specified to be executed with a priority higher than the print job by a user in advance, is input during execution of the print job, said transmission unit transmits image data of a page included in the other job to said image forming unit after transmitting, to said image forming unit, the image data of the page included in the print job corresponding to the information of the amount of the applied toner transmitted to the temperature control unit.

2. The apparatus according to claim 1, wherein, if the other job is input during execution of the print job, said transmission unit interrupts transmission of the information of the amount of the applied toner for the image data of each page included in the print job, and transmits information of the amount of the applied toner for the image data of the page included in the other job to the temperature control unit.

3. The apparatus according to claim 1, further comprising a comparison unit configured to compare the amount of the applied toner for image data of a page currently under fixing processing and the amount of the applied toner for the image data of the page included in the other job and determine whether a difference is smaller than a predetermined value, wherein, if said comparison unit determines that the difference between the amount of the applied toner al for the image data of the page currently under fixing processing and the amount of the applied toner for the image data of the page included in the other job is smaller than the predetermined value, said transmission unit transmits the image data of the page included in the other job and the information of the amount of the applied toner for the image data to said image forming unit.

4. The apparatus according to claim 3, wherein, if said comparison unit determines, continuously for a predetermined number of pages, that the difference between the amount of the applied toner for the image data of the page currently under fixing processing and the amount of the applied toner for the image data of the page included in the other job is not less than the predetermined value, said transmission unit transmits the image data of the page included in the other job and the information of the amount of the applied toner for the image data to said image forming unit.

5. The apparatus according to claim 3, wherein said comparison unit further compares the amount of the applied toner for the image data of a page subsequent to the page currently under fixing processing and the amount of the applied toner for the image data of the page included in the other job and determines whether the difference is less than the predetermined value, and if said comparison unit determines that the difference between the amount of the applied toner for the image data of the page subsequent to the page currently under fixing processing and the amount of the applied toner for the image data of the page included in the other job is less than the predetermined value, said transmission unit transmits the image data of the page included in the other job and the information of the amount of the applied toner for the image data to said image forming unit.

6. The apparatus according to claim 1, further comprising a second comparison unit configured to compare the amount of the applied toner for the image data of a page subsequent to the page currently under fixing processing and the amount of the applied toner for the image data of the page included in the other job and determine whether the difference is less than a second predetermined value, and if said second comparison unit determines that the difference between the amount of the applied toner for the image data of the page subsequent to the page currently under fixing processing and the amount of the applied toner for the image data of the page included in the other job is less than the second predetermined value, said transmission unit immediately starts transmission of the image data of each page included in the other job and transmits, to said image forming unit, an instruction to cause said image forming unit to duplicate the information of the amount of the applied toner and use the information as the information of the amount of the applied toner for the image data of the page subsequent to the page.

7. The apparatus according to claim 1, wherein the temperature control unit comprises a storage unit configured to store relationship data representing a relationship between an amount of applied toner and a fixing temperature, and the temperature control unit controls the fixing temperature based on the relationship data and the information of the amount of the applied toner for the image data of N pages that are to undergo fixing processing subsequently to the page currently under fixing processing.

8. The apparatus according to claim 1, further comprising:

a first generation unit configured to generate continuous tone image data of each page included in the print job; and a second generation unit configured to perform halftone processing for the continuous tone image data and generate a halftone image, wherein said acquisition unit acquires the amount of the applied toner based on the continuous tone image data generated by said first generation unit, and said transmission unit transmits the halftone image data generated by said second generation unit to said image forming unit.

9. The apparatus according to claim 1, wherein said transmission unit includes a first transmission queue to be used for transmission order control of image data of a page included in a normal print job and the information of the amount of the applied toner, and a second transmission queue to be used for transmission order control of image data of a page included in a job to be executed with a priority higher than the normal print job and the information of the amount of the applied toner.

10. A method of controlling an image forming apparatus including an image forming unit configured to form a toner image on a sheet based on image data of a page included in a print job, and a temperature control unit configured to control a temperature of a fixing unit when the fixing unit fixes a toner image for the image data of the page on a sheet based on an amount of applied toner for the image data of the page, the method comprising:

acquiring the amount of the applied toner for image data of each page included in the print job formed from a plurality of pages; and transmitting, to the image forming unit, image data of an Mth (M is a positive integer) page included in the print job after transmitting, to the temperature control unit, information of the amount of the applied toner for the image data of the Mth (M is a positive integer) page included in the print job, which is acquired in the acquiring, wherein, if another job, which is specified to be executed with a priority higher than the print job by a user in advance, is input during execution of the print job, in the transmitting, image data of a page included in the other job is transmitted to the image forming unit after transmitting, to the image forming unit, the image data of the page included in the print job corresponding to the information of the amount of the applied toner transmitted to the temperature control unit.

11. A non-transitory computer-readable recording medium storing a program that causes a computer to function as an image forming apparatus including an image forming unit configured to form a toner image on a sheet based on image data of a page included in a print job, and a temperature control unit configured to control a temperature of a fixing unit when the fixing unit fixes a toner image for the image data of the page on a sheet based on an amount of applied toner for the image data of the page, the image forming apparatus comprising:

an acquisition unit configured to acquire the amount of the applied toner for image data of each page included in the print job formed from a plurality of pages; and a transmission unit configured to transmit, to said image forming unit, image data of an Mth (M is a positive integer) page included in the print job after transmitting, to the temperature control unit, information of the amount of the applied toner for the image data of the Mth (M is a positive integer) page included in the print job, which is acquired by said acquisition unit, wherein, if another job, which is specified to be executed with a priority higher than the print job by a user in advance, is input during execution of the print job, said transmission unit transmits image data of a page included in the other job to said image forming unit after transmitting, to said image forming unit, the image data of the page included in the print job corresponding to the information of the amount of the applied toner transmitted to the temperature control unit.

\* \* \* \* \*